(No Model.) 3 Sheets—Sheet 1.
P. T. BERG.
APPARATUS FOR CHARGING FURNACES.
No. 432,593. Patented July 22, 1890.
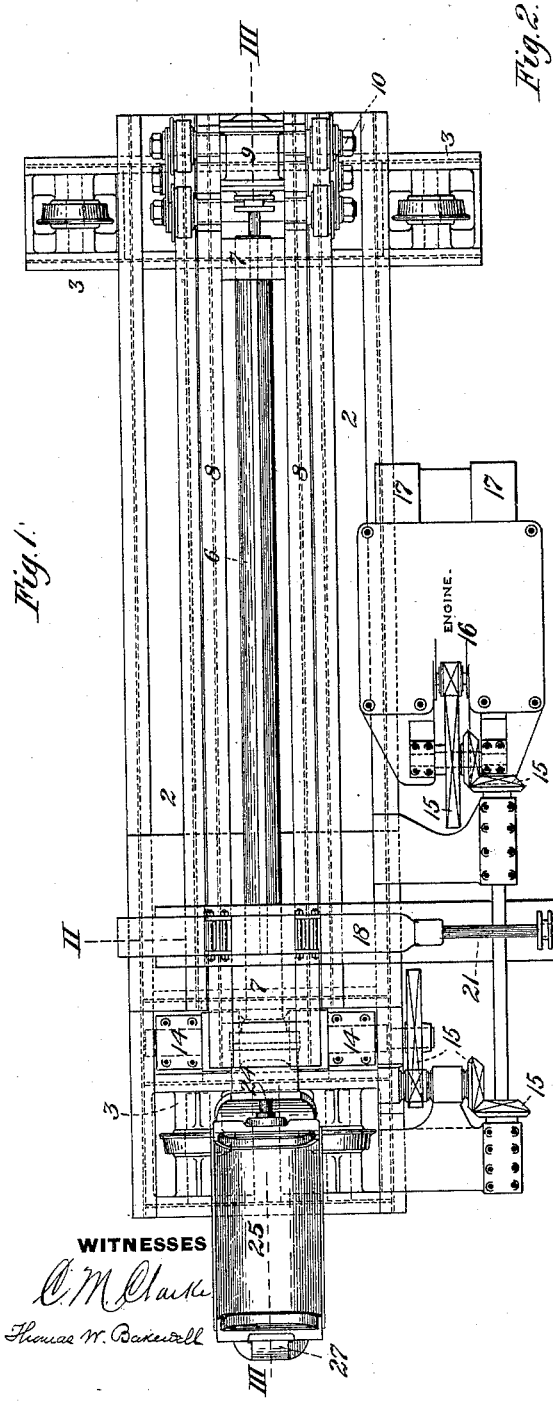
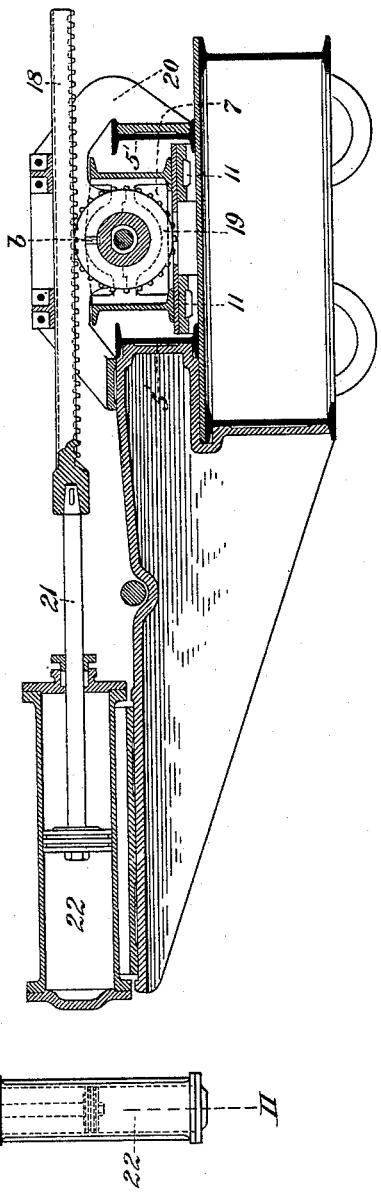
WITNESSES
INVENTOR (No Model.) 3 Sheets—Sheet 2.

P. T. BERG.
APPARATUS FOR CHARGING FURNACES.

No. 432,593. Patented July 22, 1890.

WITNESSES
INVENTOR (No Model.) 3 Sheets—Sheet 3.

P. T. BERG.
APPARATUS FOR CHARGING FURNACES.

No. 432,593. Patented July 22, 1890.

WITNESSES.

INVENTOR.

P. T. Berg.

UNITED STATES PATENT OFFICE.

PER TORSTEN BERG, OF BRADDOCK, PENNSYLVANIA.

APPARATUS FOR CHARGING FURNACES.

SPECIFICATION forming part of Letters Patent No. 432,593, dated July 22, 1890.

Application filed May 9, 1890. Serial No. 351,115. (No model.)

*To all whom it may concern:*

Figure 3:
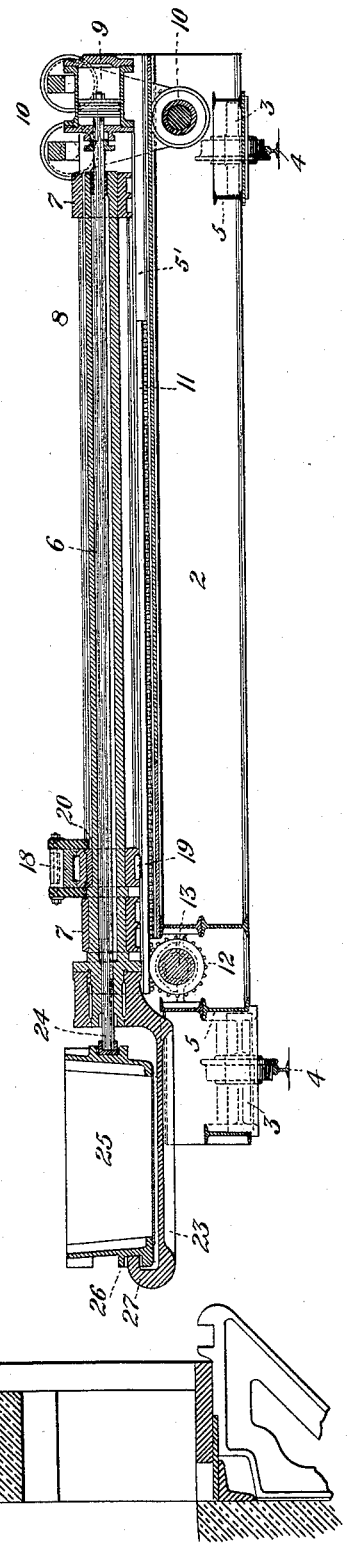
Figure 4:
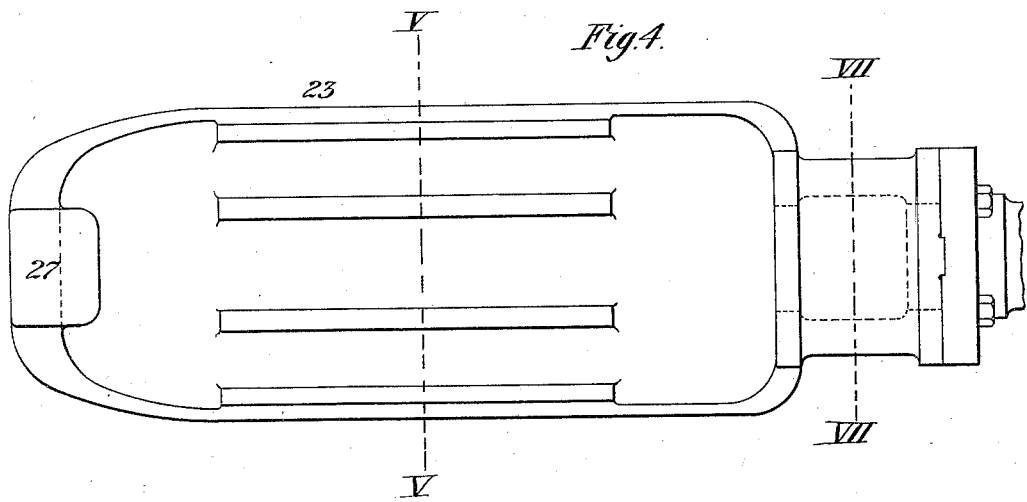
Figure 5:
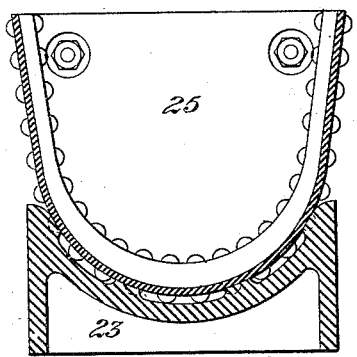
Figure 7:
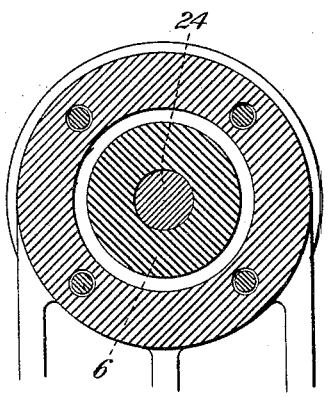
Figure 6:
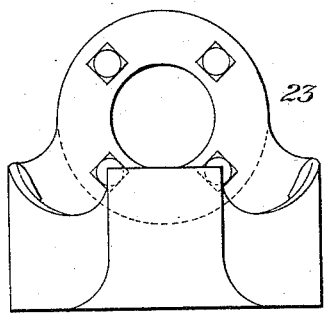

Be it known that I, PER TORSTEN BERG, of Braddock, in the county of Allegheny and State of Pennsylvania, have invented a new and useful Improvement in Furnace-Charging Apparatus, of which the following is a full, clear, and exact description, reference being had to the accompanying drawings, forming part of this specification, in which—
Figure 1 is a plan view of my improved apparatus. Fig. 2 is a vertical cross-section on the line II II of Fig. 1. Fig. 3 is a longitudinal section on the line III III of Fig. 1. Fig. 4 is a plan view of the cradle. Fig. 5 is a cross-section of the same on the line V V of Fig. 4. Fig. 6 is an end view of the cradle. Fig. 7 is a cross-section on the line VII VII of Fig. 4.

Like symbols of reference indicate like parts in each.

The object of my invention is to provide improved and efficient means for charging furnaces—such as open-hearth furnaces—with their stock of metal, &c., and it comprises, generally, the following parts: A traveling carriage which carries the charging apparatus and affords means for moving it, as desired, a longitudinally-movable bar, a frame on the carriage provided with means for holding the box in which the charge is contained, and tipping mechanism by which, when the bar is inserted into the furnace, the box may be overturned to discharge its contents.

Referring to the drawings, 2 represents the carriage or frame of the apparatus. It consists of end trucks 3, whose wheels are mounted on tracks 4, and which are connected by beams 5 and frame-work, as shown.

6 is a hollow cylindrical shaft extending transversely of the carriage and journaled in boxes 7, which are connected by beams 8, and which, together with the boxes, form a longitudinally-movable frame, fixed to the rear end of which is a small power-cylinder 9 and a secondary frame or buggy having wheels 10, which bear on the upper and under side of beams 5'. Toothed rack-bars 11 are fixed to the under side of the beams 8, which rack-bars, together with toothed pinions 12, afford means for projecting and retracting the longitudinally-movable frame. These pinions are fixed to a shaft 13, having bearings 14 on the frame of the main carriage and driven by gearing 15 from an engine 16, mounted on a bracket or platform 17, projecting from the frame of the carriage. The rotation of the pinions in one direction or the other acts on the racks and moves them with the longitudinally-movable frame and the cylinder 9 forward or backward, as the case may be. To rotate the hollow shaft 6, I employ a rack and pinion 18 and 19. The pinion is set in stationary side bearings 20, and is mounted on the shaft with a sliding power connection consisting of a feather and spline *b*. The rack is guided by suitable bearings, and at its end is connected with the plunger 21 of a power-cylinder 22, which is supported by the frame of the carriage. The front end of the shaft 6 fits in a socket at the end of a cradle 23, to which it is bolted, so that the cradle shall be rotatory therewith. The shape of the cradle is sufficiently shown in Figs. 4 and 5.

24 is a rod which extends from the piston of the cylinder 9 through the hollow shaft 6 to and beyond the front end thereof, being adapted to serve the function of a locking device for the charging-box 25. This box, which is adapted to be set in the cradle, is provided with lugs 26, arranged to interlock with a shoulder 27 thereon, as shown in Figs. 3 and 4.

In the use of the apparatus the box filled with material to be charged into the furnace is lifted by a crane and placed in the cradle, and the rod 24 is projected by the cylinder 9, so as to enter a socket at the end of the box to force the box against the front end of the cradle and to interlock the lugs and shoulder thereof. By a suitable locomotive or traveling crane the apparatus is moved along the tracks into position opposite to the furnace to be charged, the engine 16 is driven so as to rotate the pinions 12, which act on the racks 11 and move the shaft 6 and its connected parts, including the cradle, into the furnace, and the piston-rod 21 and rack 18 are then projected so as to rotate the shaft 6 on its axis in the bearings 7 and to overturn the box and discharge its contents onto the furnace-hearth. The box may then be righted by a reverse motion of the rack, the shaft withdrawn by action of the engine, and the box released by retraction of the rod 24.

As shown in Figs. 4, 5, and 6, the cradle 23 is a trough-shaped casting, suitably flanged and ribbed to afford the necessary strength. When large pieces of metal are to be charged into the furnace, instead of using the box 25 the metal may be placed directly upon the cradle and the latter then projected into the furnace and tipped. For this use of the apparatus the trough shape of the cradle is especially desirable.

The man who operates various parts of the machine above described is stationed on the apparatus, preferably on the rear truck, and the valves by which the various cylinders are controlled are placed within his reach, as will be readily understood.

The parts of the machine which I regard as new and desire to claim herein are the rotatory shaft 6, carrying the cradle and provided with a locking-rod extending through it, the locking-rod, the pinion for projecting the shaft 6 and cradle, the construction of the cradle itself, and the supporting-buggy at the rear end of the shaft.

The apparatus is simple in its construction, is easy to operate, and forms a powerful and efficient means for charging the furnace. The box-locking arrangement is of especial advantage. It saves labor in working the apparatus and enables it to be managed by but one man.

I claim—

1. In a charging apparatus, the combination of a rotatory shaft, a box-support or cradle carried thereby, a longitudinally-movable locking-rod and mechanism for projecting it, and mechanism for projecting the shaft and cradle and for tipping the same, substantially as and for the purposes described.

2. In a charging apparatus, the combination, with a traveling carriage, of a longitudinally-movable frame which is mounted on the carriage, a locking-cylinder carried by the frame, a shaft journaled in the frame and carrying a cradle or box-support, and a rod operated by the cylinder to engage and lock the box in the cradle or box-support, and mechanism for rotating and projecting the shaft, substantially as and for the purposes described.

3. In a charging apparatus, the combination, with a traveling carriage, of a longitudinally-movable frame which is mounted on the carriage, a locking-cylinder carried by the frame, a hollow shaft journaled in the frame and carrying a cradle or box-support, a rod passing through the shaft and operated by the cylinder to engage and lock the box in the cradle or box-support, and mechanism for rotating the shaft and projecting the frame, substantially as and for the purposes described.

4. In a charging apparatus, the combination, with a traveling carriage, of a longitudinally-movable frame which is mounted on the carriage, a buggy carried by the frame and bearing on the frame-work of the carriage, rack-and-pinion gearing for projecting the frame, a rotatory shaft, and mechanism for rotating the shaft and projecting the frame, substantially as and for the purposes described.

5. In metal-charging apparatus, the combination, with a rotatory shaft, of a cradle carried thereby and having a locking-lug, a box adapted to be carried in the cradle, and pushing mechanism by which the box is forced into interlocking engagement with the locking-lug, substantially as and for the purposes described.

6. In metal-charging apparatus, the combination, with a rotatory shaft, of a trough-shaped cradle carried thereby and adapted to receive a box of the character specified, and means for locking the box in the cradle, substantially as and for the purposes described.

7. In metal-charging apparatus, the combination, with a rotatory shaft, of a cradle carried thereby, a box adapted to be carried in the cradle, and pushing mechanism by which the box is held in the cradle, substantially as and for the purposes described.

8. In metal-charging apparatus, the combination, with a rotatory shaft, of a longitudinally-movable frame by which it is carried, a cradle or box-support carried by the shaft, a lock movable to engage and hold a box in the cradle or support, and mechanism carried by the frame by which the lock is operated, substantially as and for the purposes described.

In testimony whereof I have hereunto set my hand this 3d day of May, A. D. 1890.

PER TORSTEN BERG.

Witnesses:
W. B. CORWIN,
H. M. CORWIN.